US005836161A

United States Patent [19]

Malina

[11] Patent Number: 5,836,161

[45] Date of Patent: Nov. 17, 1998

[54] HYDRAULIC PRESSURE BOOSTER

[75] Inventor: Viktor Malina, Kissleg, Germany

[73] Assignee: Tox Pressotechnik GmbH, Weingarten, Germany

[21] Appl. No.: 849,828

[22] PCT Filed: Dec. 14, 1995

[86] PCT No.: PCT/DE95/01795

§ 371 Date: Sep. 19, 1997

§ 102(e) Date: Sep. 19, 1997

[87] PCT Pub. No.: WO96/18825

PCT Pub. Date: Jun. 20, 1996

[30] Foreign Application Priority Data

Dec. 16, 1994 [DE] Germany .......................... 44 45 011.7

[51] Int. Cl.[6] .............................. F15B 7/00; B60T 13/58

[52] U.S. Cl. ................................ 60/560; 60/561; 60/563; 60/565; 60/567

[58] Field of Search ................................ 91/4 R; 92/151, 92/152, 105, 34; 60/560, 561, 563, 565, 584, 567

[56] References Cited

U.S. PATENT DOCUMENTS

| | | | |
|---|---|---|---|
| 3,875,365 | 4/1975 | Beneteau | 60/560 X |
| 5,040,369 | 8/1991 | Rapp | 60/560 |
| 5,247,871 | 9/1993 | Brasca et al. | 60/560 X |
| 5,377,488 | 1/1995 | Malina | 60/563 X |
| 5,381,661 | 1/1995 | Malina | 60/560 |

FOREIGN PATENT DOCUMENTS

| | | |
|---|---|---|
| 2001387 | 1/1970 | Germany . |
| 1909337 | 9/1970 | Germany . |
| 2093533 | 9/1982 | United Kingdom . |
| 9315323 | 8/1993 | WIPO . |

*Primary Examiner*—Hoang Nguyen
*Attorney, Agent, or Firm*—Edwin E. Greigg; Ronald E. Greigg

[57] ABSTRACT

A hydro-pneumatic pressure booster is proposed in which the reservoir chamber is limited by an elastic partition wall instead of a sliding piston.

22 Claims, 3 Drawing Sheets

HYDRAULIC PRESSURE BOOSTER

PRIOR ART

The invention is based on a hydraulic pressure booster. In a known pressure booster of this type (DE-OS 42 23 411 or WO-93 15 323), the particular problem of this kind of pressure booster, namely the sealing between oil and air between the reservoir chamber that contains the oil and the pressurized air chamber that produces the reservoir pressure, by creating a pressure-relieved chamber disposed between them. Any air or fluid quantities that penetrate at the plunger or the jacket face of the intermediary piston are captured and removed via annular ventilation grooves disposed there. An apparatus of this kind requires an extremely precise coaxial disposition of plunger, intermediary piston, and cylinder jacket. In addition, the necessary sealing requires a number of radial seals that are subject to natural wear and tear. While a radial sealing is for the most part unproblematic to the plunger due to the small diameter, this sealing problem increases super-proportionally with the diameter of the outer piston jacket face.

THE INVENTION AND ITS ADVANTAGES

The hydraulic pressure booster according to the invention, has the advantage over the prior art that in the region of the movable dividing wall, an absolute and quasi wear-free seal can be produced between the oil-filled reservoir chamber and the air chamber disposed on the side of the dividing wall remote from this reservoir chamber. In this case, this can be a pressurized air chamber that determines the pressure in the reservoir chamber as well as a chamber under atmospheric pressure, wherein there can be a spring force that engages the dividing wall and influences the pressure in the reservoir chamber. Also, the reservoir chamber can be accommodated in a separate reservoir that has a connection to the working chamber, which connection is controlled, for example, by the control piston (plunger). Through this kind of a separate disposition of the reservoir, a number of pressure boosters can be supplied by only one reservoir, wherein at the control point between the reservoir chamber and the working chamber according to the invention, a wide variety of types of control device can be inserted, whose type is to a large extent independent of the remaining embodiment of the pressure booster. In this way, any electrically actuated slider or a valve can be used as a control device, without the plunger being eliminated as a result. Due to the absolute seal between the reservoir chamber and the air chamber, the pressure can also be increased, with the advantages mentioned below in an adapted structural embodiment.

According to an advantageous embodiment of the invention, the dividing wall is embodied as tubular, as a corrugated tube that can be changed in the axial direction in the stroke, or as a tube that can be changed in the radial direction in the diameter. Corrugated tubes of this kind are known in a number of ways, for example in the form of a metal compensator or a rubber or plastic protective tubes of telescopes. In the same way, a hydro-pneumatic pressure booster is also known (WO 83/04 288), in which the air pressure chamber is defined by a corrugated tube, which surrounds the pressure piston and thus renders its stroke possible.

According to another advantageous embodiment of the invention, the dividing wall is embodied in the shape of a cone. By means of this, the corrugated tube material can advantageously be more intensely compressed in the axial direction.

According to another advantageous embodiment of the invention, the dividing wall is embodied so that it has an intrinsic elastic resilience and influences the reservoir pressure.

According to another advantageous embodiment of the invention, the dividing wall, which is embodied as a bellows, rolling membrane, tubular membrane, or the like, is comprised of rubber, metal, or another comparable elastic material, for example plastic.

According to another advantageous embodiment of the invention, in order to influence the reservoir pressure, a spring force, for example a helical spring, engages the dividing wall. The dividing wall can then have a corresponding bottom plate for engaging with the helical spring.

According to another advantageous embodiment of the invention, the side of the dividing wall remote from the reservoir chamber is acted upon by a particular pneumatic pressure so that the surface pressure loading on both sides of the stroke wall is balanced.

According to another advantageous embodiment of the invention, which is also intrinsically valid, the jacket face of the reservoir chamber is embodied as at least partially transparent. By means of this, it can be easily determined how much fluid is in the reservoir chamber and whether a refilling or a complete fill-up is required. This feature is also valid in and of itself since it can also be advantageously used in the known pressure boosters, but can be used to particular advantage with the invention. A simple optical control of this kind is particularly advantageous especially in the event of a reservoir that supplies a number of pressure boosters with fluid, and in particular if it concerns a low reservoir pressure.

According to another advantageous embodiment of the invention, the dividing wall is clamped on one end and on the end region remote from the clamped part, is connected by means of a bottom plate that is movably connected to the dividing wall, but is intrinsically rigid. The clamping is advantageously provided on the outer edge region.

According to another advantageous embodiment of the invention, a plunger that is disposed coaxially to the working piston is used as a control device, wherein the dividing wall has a central ring (bottom plate) that is penetrated by the plunger and is sealed radially in relation to it. A ring of this kind is suited for use both as a support for a helical spring and for the impingement of air or possibly also a fluid that determines the reservoir pressure. Alternatively, the dividing wall can also be affixed to the plunger.

According to another advantageous embodiment of the invention, the ring can be moved on the plunger in its axial direction, wherein the radial seal here can be produced with comparative ease due to the relatively small diameter.

According to another advantageous embodiment of the invention, the spring force that acts on the dividing wall and influences the reservoir pressure engages one end with the dividing wall and on the other end, with a control piston that is connected to the plunger. The spring force can be produced by a pneumatic spring or a mechanical spring, for example a helical spring. In the latter instance, the structure can be similar to that of the pressure booster according to the preamble.

According to another advantageous, likewise intrinsically valid embodiment of the invention, an intermediary piston is disposed floating in the stroke direction between the stroke wall and the control piston; this intermediary piston is engaged on one end by the spring force acting toward the control piston and is engaged on the other end by the spring force acting toward the stroke wall.

According to another advantageous embodiment of the invention, the pressure booster receptacle that contains the reservoir chamber is spatially independent of the cylinder that contains the plunger, wherein according to a related embodiment of the invention, a number of working chambers can be supplied by this single reservoir chamber. Particularly when a number of pressure boosters are provided at a production site, considerable material costs and also control expenses can be eliminated through the use of only one reservoir. Not least, an apparatus of this kind also saves space.

According to another related advantageous embodiment of the invention, the connection of the reservoir chamber to a number of working chambers can be controlled by means of only one control point. In so doing, the pressure stroke can begin simultaneously in a number of pressure boosters, controlled by means of one control point.

According to another advantageous embodiment of the invention, the dividing wall is disposed concentric to the working piston and in the housing that encompasses it (tubular membrane). By means of this, the overall structural length of the pressure booster is shortened through the utilization of the unused housing volume around the working chamber.

According to a related advantageous embodiment of the invention, a jacket tube is disposed radially around the dividing wall, wherein the annular chamber disposed between the dividing wall and the jacket tube is used as a pneumatic chamber. The dividing wall is thus embodied as a tubular membrane.

According to another advantageous embodiment of the invention, the pressure in the pneumatic chamber corresponds to the reservoir pressure or to a pneumatic pressure that produces the rapid motion of the working piston. The pneumatic rapid motion pressure can impinge simultaneously on the tubular membrane and the annular auxiliary piston of the working piston.

According to another alternative advantageous embodiment of the invention, the pressure fluid, which is under reservoir pressure and is supplied from the reservoir chamber, is used to drive the rapid stroke of the working piston. Whereas in pressure boosters of this kind, an extra, usually pneumatically driven piston normally produces the rapid stroke, according to this embodiment of the invention, this kind of piston can be eliminated since due to the higher reservoir pressure that can be achieved with the invention, it is possible to supply the correspondingly higher fluid quantity per unit of time required for the rapid motion.

According to another advantageous embodiment of the invention, only one working chamber can be connected to the pressure chambers of a number of working pistons so that after closing the connection between the reservoir chamber and the working chamber and the dipping of the plunger into the working chamber, a number of working pistons can be moved, driven under the same working pressure. In this likewise intrinsically valid embodiment of the invention, a number of working pistons can advantageously be actuated via a central device for storage and pressure generation, which working pistons, when correspondingly remote from the center, can be connected to it via lines.

Other advantages and advantageous embodiments of the invention ensue from the following description, the drawings and the claims.

BRIEF DESCRIPTION OF THE DRAWINGS

Three exemplary embodiments of the subject of the invention are represented with variants in the drawings and are described in detail below.

DESCRIPTION OF THE EXEMPLARY EMBODIMENTS

Figure 1:
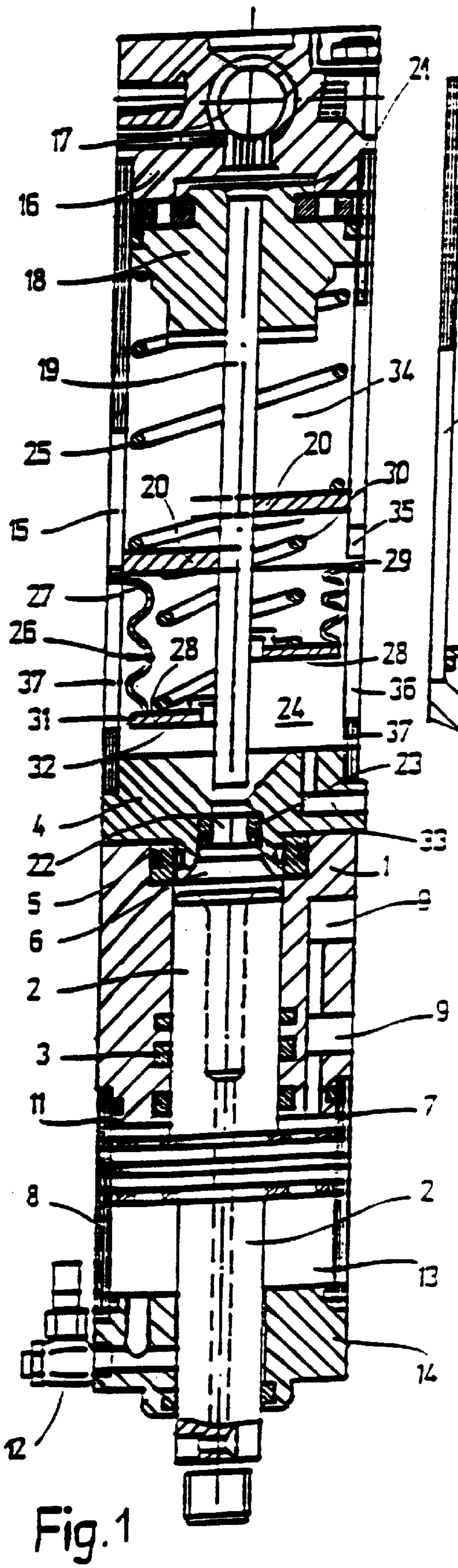
FIG. 1 shows a longitudinal section through a hydro-pneumatic pressure booster with an elastic reservoir wall.

The hydro-pneumatic pressure booster represented in FIG. 1 has a housing 1 in which a working piston 2 is disposed so that it can move axially and is sealed radially via seals 3. The housing 1 is closed toward the top by an axially inserted housing part 4, through the use of radial sealing elements 5, wherein a working chamber 6 is produced.

The working piston 2 has an auxiliary piston 7 with a large diameter, which functions in a radially sealing manner and can be axially slid in a working cylinder 8 and can be acted upon pneumatically for a rapid drive of the working piston 2. According to the adjustment direction, either the pressurized air is conducted via the connections and conduits 9 disposed above the auxiliary piston into an upper pneumatic chamber 11, which is defined by the housing 1, the working piston 2, the auxiliary piston 7, and the working cylinder 8, or the pressurized air is conducted via a connection and conduits 12 into a lower pneumatic chamber 13, which is defined by the working piston 2, the auxiliary piston 7, the working cylinder 8, and a lower housing cover 14, wherein the working piston 2 is centrally guided so that it seals radially in the lower housing cover 14, in which the conduits 12 are also disposed. Furthermore, this lower housing cover 14 is used as a support for the tension bar of the pressure booster, which bar, not shown, runs parallel to the housing 1 and the working cylinder 8.

A jacket tube 15 is placed on the housing piece 4 and is in turn closed at the top by an upper housing cover 16 in which there are connections and conduits 17, which lead from above into the jacket tube 15 and are for pressurized control air. A control piston 18 functions in the jacket tube 15 and a plunger 19 is disposed on it which, together with the jacket tube 15 and the housing cover 16, defines a control chamber 21. After traveling a particular stroke, the plunger 19 dips into a central bore 22 of the housing piece 4 and into a radial seal 23 disposed there, by means of which the working chamber 6 is closed at the top. As the dip into the working chamber 6 increases, the oil displaced there causes a corresponding movement of the working piston 2 downward so that with a relatively low pneumatic control pressure in the control chamber 21 and due to the small diameter of the plunger 19 in relation to the diameter of the working piston 2, which is significantly greater in diameter, a hydro-pneumatic pressure boosting occurs. During the rapid motion produced via the auxiliary piston 7, which rapid motion occurs before the actuation of the plunger 19 and is used to move the working piston 2 toward the product, in order to assure a replenishing of oil in the working chamber 6, an oil reservoir chamber 24 that is subjected to overpressure is required. The restoring of the control piston 18 is carried out via a helical spring 25 that is disposed inside the jacket tube 15 and is supported on the end remote from the control piston 18 against a floating intermediary piston 20 disposed in the jacket tube 15 and shown in two work positions.

In the first exemplary embodiment shown in FIG. 1, the oil reservoir chamber 24 is disposed above the housing piece 4 and is defined by the housing piece 4, the jacket tube 15, and the plunger 19 as well as an elastic dividing wall 26, which is comprised of a corrugated tube 27 and a bottom plate 28, wherein the corrugated tube 27 is fastened with its upper, outer edge at 29 internally against the jacket tube 15 and with its lower end at 31 to the outer circumference of the bottom plate 28. The corrugated tube 27 can have a given spring action in the direction of the oil reservoir chamber 24. A helical spring 30 is disposed between the bottom plate 28 and the intermediary piston 20 and determines the reservoir pressure. Naturally, in lieu of this spring pressure, another spring force that acts on the bottom plate can be used, for example a pneumatic working pressure provided above the dividing wall. The bottom plate 28, which is penetrated centrally by the plunger 19, has a radial seal 22 in relation to the plunger 19. In the left half of the drawing, the bottom plate 28 is shown moved downward to a large degree—this for better clarity—although the right half of the work position shown corresponds to that of the working piston 2. In the housing part 4, moreover, an oil filling nipple is provided with conduits 33 for filling the oil reservoir chamber 24 with oil or for compensating for leakage losses. The chamber 34 provided above the dividing wall 26 is pressure relieved toward the atmosphere via openings 35. A viewing glass 36 for checking the oil level present in the oil reservoir chamber 24 is disposed in the section of the jacket tube 15, between the connecting point 29 and the housing piece 4. Since the oil reservoir chamber 24 has relatively low oil pressures and in addition, through the use of the dividing wall according to the invention, no piston rests in a radially sealing fashion in this section 37 of the jacket tube 15 encompassing the oil reservoir chamber 24, then the entire section 37 that likewise acts as the jacket tube can also be comprised of transparent material.

For the description of the exemplary embodiments represented in FIGS. 2 to 5 or their variants, in the following embodiments, the same reference numerals are used for the parts that can likewise be inferred in FIG. 1, but they are increased by the number 100, 200, 300, or 400 so that an extra explanation is not necessary for these parts. However, new parts not yet mentioned in FIG. 1 are numbered in a continuing fashion.

Figure 2:
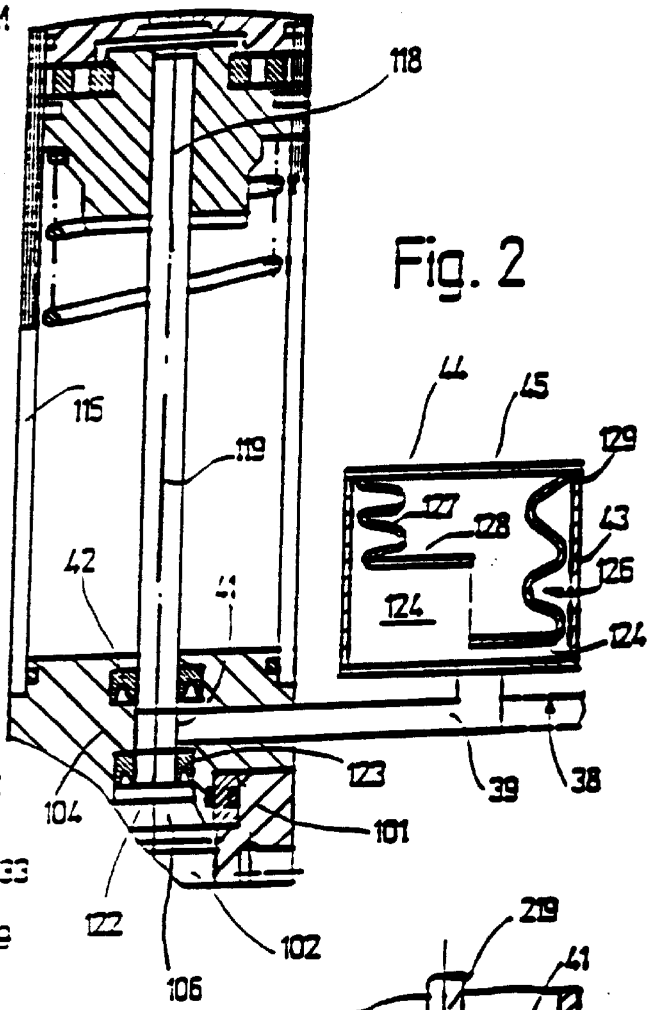
FIG. 2 shows the same with an external reservoir.

In the second exemplary embodiment according to FIG. 2, the oil reservoir chamber 124 is disposed in an oil reservoir 38 that is independent of the housing 101 and is connected to the working chamber 106 via a line 39 and the housing piece 104, upstream of the central bore 122 and the radial seal 123, respectively. In this exemplary embodiment, the plunger 119 does not come completely out of the bore 122 in its return stroke, where in the upper starting position shown, though, it holds open the mouth 41 of the line 39 into the bore 122. In the remaining dip region of the plunger 119 in the bore 122, a radial seal 42 is disposed in the housing piece 104. With a correspondingly favorable guidance and a given seal between the plunger 119 and the wall of the bore 122, the radial seal 123 can be eliminated if the mouth 41 is cleanly closed in the downward stroke of the plunger 119 and the working pressure is not too high. The oil reservoir 38 has a cup-like housing 43 whose upper edge is fastened to the corrugated tube 127 and which is closed toward the top by a cover 44 in which ventilation openings 45 are disposed. Otherwise, the stroke wall 126 is embodied the same as in the first exemplary embodiment, wherein the bottom plate 128, though, has no central opening for lack of a plunger. Here, too, the housing 43 or parts of the housing can be comprised of a transparent material in order to be able to see the oil level.

Figure 3:
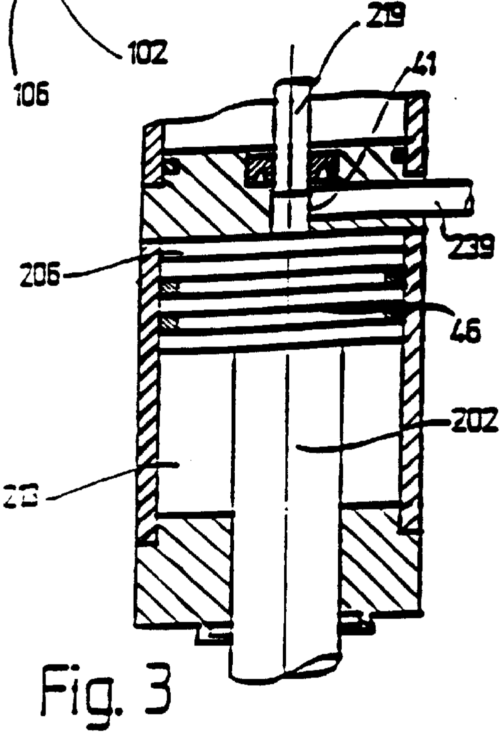
FIG. 3 shows the same with a single piston.

In the embodiment represented in FIG. 3, the working piston 202 is embodied as significantly narrower and merely has a piston step 46 toward the top, which has a larger diameter, defines the working chamber 206 toward the top, and defines the pneumatic chamber 213 toward the bottom. Through the external disposition of the oil reservoir 38, a great deal more hydraulic oil can be supplied and at a greater pressure than in an apparatus of the kind depicted in FIG. 1. This produces the possibility that the rapid stroke of the working piston 202 can be executed by means of rapidly and sufficiently incoming oil via the line 239, until the line 239 is then closed by the plunger 219, whereupon the high pressure phase or the work stroke of the working piston 202 then begins. The rapid return is pneumatically carried out in a known manner via the lower pneumatic chamber 213, as described in conjunction with FIG. 1. Since the cross section of the piston step 46 is decisive for the working force of the working piston 202, in order to achieve the same work output as the one represented in FIG. 1, this embodiment shown in FIG. 3 can be significantly narrower and therefore lighter in mass and can be used in a very versatile way. The sufficient supply of oil from the oil reservoir is decisive.

Figure 4:
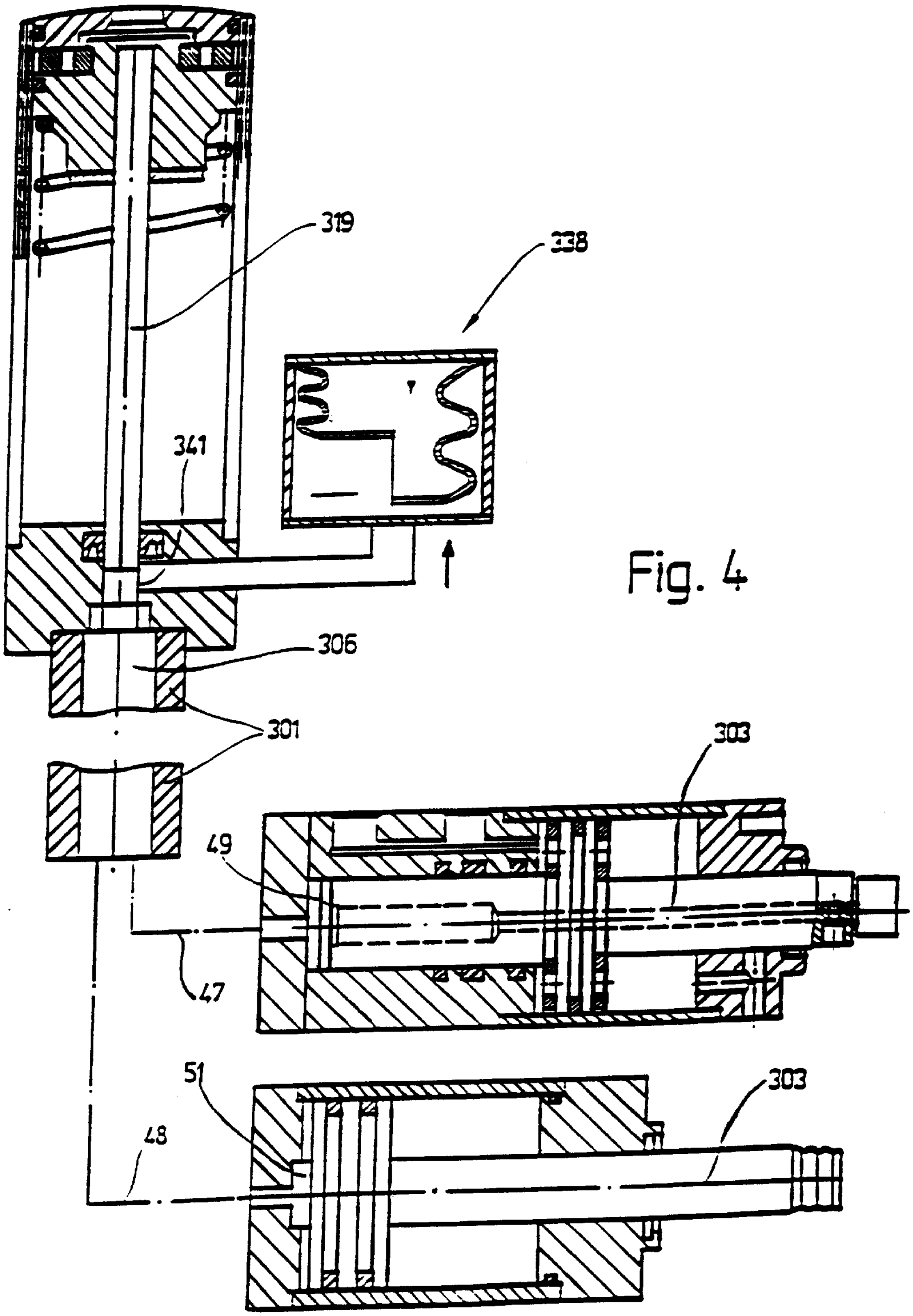
FIG. 4 shows an embodiment with a number of pistons.

In the variant represented in FIG. 4, both the disposition and actuation of the plunger 319 and the oil reservoir 338 as well correspond to the embodiment shown in FIG. 2. The working chamber 306 in this case is merely embodied as a tubular section from which lines 47 and 48 lead to working pistons 303, which are independent of the working chamber 306, or to the pressure chambers 49 and 51 disposed there. While the former working unit represented above, with the pressure chamber 49, corresponds to the one in FIG. 1, the latter working unit represented above, with the pressure chamber 51, corresponds to the one embodied in FIG. 3. It is consequently possible to use one oil reservoir 338 and one plunger 319 to actuate a number of working units via a common working chamber 306. Here, too, it is of corresponding importance that the oil reservoir 338 supplies both the sufficient oil quantity and the required pressure.

Figure 5:
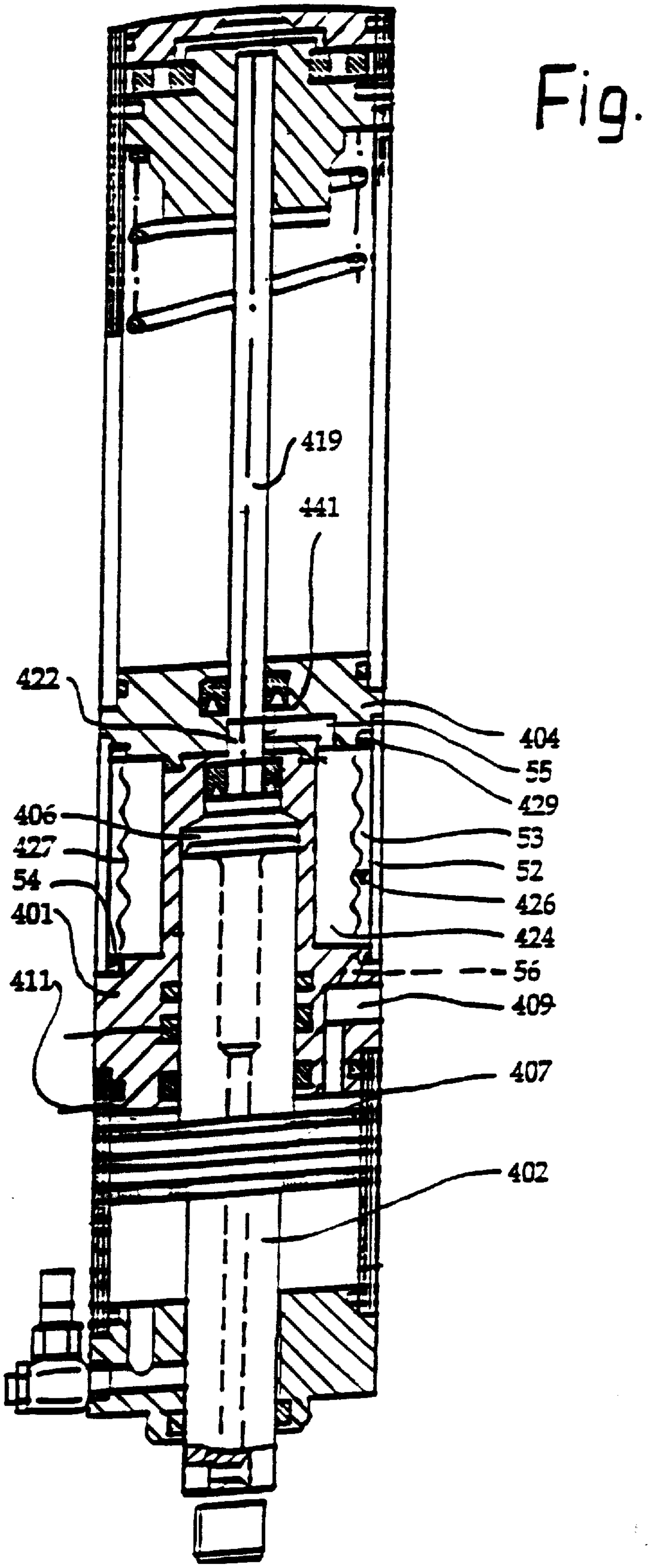
FIG. 5 shows an embodiment with the reservoir wall as a tubular membrane.

In principle, the third exemplary embodiment represented in FIG. 5 functions in the same manner as the second exemplary embodiment represented in FIG. 2 so that a repetition of the description can be omitted. The difference is comprised in the disposition of the reservoir chamber 424 and the elastic dividing wall 426, respectively. The reservoir chamber 424 and the dividing wall 427 are disposed concentric to the working piston 402, in the housing 401 that encompasses it. The dividing wall 426, which is embodied in the form of a tubular membrane 427, has an upper connecting point 429 to the housing piece 404 and a lower connecting point 54 to the housing 401. The reservoir chamber 424 is connected via a conduit 55 to the central bore 422 in which the plunger 419 works and controls the mouth 441. A pneumatic chamber 53 is disposed on the side of the dividing wall 426 remote from the oil reservoir chamber 424 and is closed toward the outside by means of a jacket tube 52 which extends between the housing 401 and the housing 404. This pneumatic chamber 53 is connected by a conduit 56 to the conduit 409, which feeds into the upper pneumatic chamber 411 of the auxiliary piston 407, via which the rapid motion of the working piston 402 is controlled. Advantageously, through this given disposition of the dividing wall 426 with the reservoir chamber 424 and pneumatic chamber 53 or the jacket tube 52, intrinsically unused space in the housing 401 is utilized without thus necessitating an extra chamber for the reservoir chamber, with the result that the pressure booster as a whole can be shorter in structure without needing to have a greater diameter because of this.

All of the features represented in the description, the ensuing claims, and the drawings can be essential to the invention both individually and in arbitrary combination with one another.

Reference Numeral List

| | | | |
|---|---|---|---|
| 1, 101, 401 | housing | 30 | |
| 2, 202, 402 | working piston | 31 | radial seal |
| 3, 303 | seals | 32 | radial seal |
| 4, 104, 404 | housing piece | 33 | nipple & conduits |
| 5 | radial sealing elements | 34 | chamber |
| 6, 106, 206, 306, 406 | working chamber | 35 | openings |
| 7, 407 | auxiliary piston (pressurized air for rapid drive) | 36 | viewing glass |
| 8 | working cylinder | 37 | section of 15 |
| 9, 409 | connection & conduits reservoir | 38, 338 | oil |
| 10 | | 39, 239 | line |
| 11, 411 | upper pneumatic chamber | 40 | |
| 12 | connection & conduits | 41, 441 | mouth |
| 13, 213 | lower pneumatic chamber | 42 | radial seal |
| 14 | lower housing cover | 43 | housing |
| 15 | jacket tube | 44 | cover |
| 16 | upper housing cover | 45 | ventilation opening |
| 17 | connection & conduits | 46 | piston step |
| 18 | control piston | 47 | line |
| 19, 119, 219, 319, 419 | plunger | 48 | line |
| 20 | | 49 | pressure chamber |
| 21 | control chamber | 50 | |
| 22, 122, 422 | central bore | 51 | pressure chamber |
| 23, 123 | radial seal | 52 | jacket tube |
| 24, 124, 424 | oil reservoir chamber | 53 | pneumatic chamber |
| 25 | helical spring | 54 | connecting point |
| 26, 126, 426 | dividing wall | 55 | conduit |
| 27, 127, 427 | corrugated tube, tubular membrane | 56 | conduit |
| 28, 128 | bottom plate | | |
| 29, 429 | connecting point | | |

The invention claimed and desired to be secured by Letters Patent of the United States:

1. A hydraulic pressure booster comprising,
   - a fluid-filled working chamber (6, 106) for alternating pressures of a low reservoir pressure and a high working pressure,
   - a fluid-filled reservoir chamber (24, 124), which is under reservoir pressure is hydraulically connected to the working chamber (6, 106) and has a movable dividing wall (26, 126),
   - a working piston (2, 102) that functions in the working chamber (6, 106) and whose stroke can be transmitted outside the pressure booster,
   - an externally actuatable pneumatic plunger (19, 119) for driving a piston (18, 118) of the working piston (2, 102) dips into the working chamber (6, 106) and
   - with a control point in a connection (22, 122, 41, 39) between the working chamber (6, 106) and the reservoir chamber (24, 124), which connection can be closed by a control device in order to produce the high working pressure in the working chamber (6, 106) after the dipping of the plunger (19, 119),
   - the movable dividing wall (26, 126, 426) is clamped in a stationary manner at least at one of its end regions (29, 129, 429), and
   - the dividing wall (26) is embodied as a membrane (27, 127, 427) that is comprised of elastic material and defines the reservoir chamber (24, 124, 424).

2. A pressure booster according to claim 1, in which the dividing wall (26, 126, 426) is embodied as a corrugated tube (27, 127) that can be changed in an axial direction in the stroke, or as a tube (427) that can be changed in a radial direction in the diameter.

3. A pressure booster according to claim 2, in which the dividing wall tube (27, 127) is embodied in the shape of a cone.

4. A pressure booster according to claim 1, in which the dividing wall (427) is embodied so that it influences the reservoir pressure and is elastically resilient.

5. A pressure booster according to claim 1, in which the dividing wall (bellows 27, 127, rolling membrane, tubular membrane 427) is selected from a material consisting of rubber, metal, or a comparable elastic material.

6. A pressure booster according to claim 1, in which in order to influence the reservoir pressure, a spring force engages the dividing wall or bottom plate (28).

7. A pressure booster according to claim 1 in which a side of the dividing wall (26, 126, 426) remote from the reservoir chamber (24, 124, 424) is acted upon by a particular pneumatic pressure.

8. A pressure booster according to claim 1 in which the jacket face (37, 43) of the reservoir chamber (24, 124) is at least partially (36) transparent.

9. A pressure booster according to claim 1, in which the dividing wall (26, 126) is clamped on one end and on the end region remote from the clamped part, is connected by means of a bottom plate (28, 128) that can move with the dividing wall (26, 126), but is intrinsically rigid.

10. A pressure booster according to claim 9, in which a plunger (19, 119) that is disposed coaxially to the working piston (2, 102) is used as a control device, and that the dividing wall (26, 126) has a central ring or bottom plate (28) that is penetrated by the plunger (19, 119) and is radially sealed in relation to this plunger.

11. A pressure booster according to claim 10, in which the ring (28) can move on the plunger (19).

12. A pressure booster according to claim 9, in which the spring force, which acts on the dividing wall, influences the reservoir pressure, and is produced by a pneumatic spring and/or a mechanical spring (25), acts on the dividing wall (26) on one end and acts on a control piston (28) connected to the plunger (19) on the other end.

13. A pressure booster according to claim 12, in which an intermediary piston (20) that floats in the stroke direction is disposed between the dividing wall (26) and control piston (18) and is engaged on one end by the spring force (25, 30) acting in the direction of the control piston (18) and is engaged on the other end by the spring force (25, 30) acting in the direction of the dividing wall (26).

14. A pressure booster according to claim 1, in which a housing (43) that contains the reservoir chamber (124) is spatially independent of the jacket tube (115) that contains the plunger (119).

15. A pressure booster according to claim 1 in which a number of working chambers (106) are supplied by only one reservoir chamber (324).

16. A pressure booster according to claim 15, in which the connection of the reservoir chamber to a number of working chambers can be controlled by means of only one control point.

17. A pressure booster according to claim 1 in which the dividing wall (427) is disposed concentric to the working.

18. A pressure booster according to claim 17, in which a jacket tube (52) is disposed radially encompassing the dividing wall (427).

19. A pressure booster according to claim 18, in which the annular chamber disposed between the dividing wall (427) and the jacket tube (52) is used as a pneumatic chamber (53).

20. A pressure booster according to claim 19, in which the pressure in the pneumatic chamber (53) corresponds to the reservoir pressure or to a pneumatic pressure that produces the rapid motion of the working piston (2).

21. A pressure booster according to claim 1 in which under reservoir pressure, the pressure fluid supplied from the reservoir chamber is used to drive the rapid stroke of the working piston (202).

22. A pressure booster according to claim 1 in which only one working chamber can be connected to the pressure chambers (49, 50) of a number of working pistons (303).

* * * * *